No. 770,083.

Patented September 13, 1904.

UNITED STATES PATENT OFFICE.

EUGENE C. MAY, OF CHICAGO, ILLINOIS.

COMPOSITION OF MATTER.

SPECIFICATION forming part of Letters Patent No. 770,083, dated September 13, 1904.

Application filed October 14, 1903. Serial No. 177,055. (No specimens.)

*To all whom it may concern:*

Be it known that I, EUGENE C. MAY, a citizen of the United States, and a resident of Chicago, in the county of Cook and State of Illinois, have invented a new and Improved Composition of Matter, of which the following is a full, clear, and exact description.

The object of the invention is to provide a new and improved composition of matter to be used for the manufacture of fire-bricks, tiling, and the like and which is exceedingly hard and solid and not liable to deteriorate under the influence of air or high heat.

The composition of matter consists of the following ingredients in the proportions stated, namely: pulverized coal-ashes, one ton; powdered silica, one-fifth of a ton; a binding material, such as cement or lime, one-fifth of a ton.

In order to produce the bricks, tilings, or like articles, I proceed as follows: Common coal-ashes or slag—such as are collected from dwellings, office-buildings, factories, &c.—are ground by the use of a suitable crusher into powdered form, and this powder is dried in a suitable drying device to remove the moisture. To one ton of the divided and dried ashes is added one-fifth of a ton of finely-divided silica to destroy the oxid of iron contained in the ashes, so as to prevent fusing in the finished article when the latter is subjected to high heat. To the ashes and silica is added one-fifth of a ton of a binding material, such as cement or lime. The ingredients mentioned are thoroughly mixed while in a dry condition to produce a thorough affiliation of the component parts of the mass, and then sufficient water is added to make the composition thoroughly moist for pressing the composition in molds by suitable machinery to form bricks, tiles, or like articles. After the article is pressed it is subjected to a hot-air blast to completely dry the article, and then the latter is coated with a thin coating consisting of carborundum, calcium chlorid, and sodium silicate in proportionate parts and formed into paste. This coating renders the article proof against heat and moisture and renders the article highly refractory. The coating also serves to render the article very hard and fireproof, and it reinforces the article to such an extent that the edges are not liable to chip or break when setting or handling the bricks or tiles.

By the above-described arrangement a very superior fire-brick can be produced, indestructible in high heat and especially adapted for the linings of blast-furnaces.

Having thus described my invention, I claim as new and desire to secure by Letters Patent—

1. As a new article of manufacture, a pressed brick, tiling or like article, consisting of a mixture of pulverized ashes, powdered silica, a binding material, and a coating of carborundum, calcium chlorid and sodium silicate, as set forth.

2. The herein-described method for producing fireproof bricks, paving-bricks, tilings and like articles, consisting in mixing powdered silica with ashes, for destroying the oxid of iron in the ashes, then binding the silica and ashes by a binding material, then subjecting the mixture to pressure in a mold, then subjecting the molded article to a blast, for drying the same, and finally coating the article, to render the same highly refractory, as set forth.

In testimony whereof I have signed my name to this specification in the presence of two subscribing witnesses.

EUGENE C. MAY.

Witnesses:
DANIEL S. WENTWORTH,
T. W. BROWN.